United States Patent
de la Red et al.

(10) Patent No.: US 6,873,849 B2
(45) Date of Patent: Mar. 29, 2005

(54) METHOD AND APPARATUS FOR SOLVING NUMBER PORTABILITY IN ORIGIN

(75) Inventors: Vincente de Vega de la Red, Madrid (ES); Roberto David Carnero Ros, Madrid (ES)

(73) Assignee: Telefonaktiebolaget LM Ericsson, Stockholm (SE)

(*) Notice: Subject to any disclaimer, the term of this patent is extended or adjusted under 35 U.S.C. 154(b) by 428 days.

(21) Appl. No.: 10/196,633

(22) Filed: Jul. 16, 2002

(65) Prior Publication Data

US 2003/0032432 A1 Feb. 13, 2003

(30) Foreign Application Priority Data

Jul. 19, 2001 (EP) .......................................... 01202780

(51) Int. Cl.[7] ................................................ H04Q 7/20
(52) U.S. Cl. ...................... 455/445; 455/433; 455/462; 455/552.1; 370/402; 370/466; 370/328; 379/220.01; 379/221.13; 379/221.14
(58) Field of Search ................................ 455/445, 433, 455/462, 552.1, 517, 560; 370/402, 328, 400, 401, 386, 466; 379/220.01, 221.13, 221.14, 413.02

(56) References Cited

U.S. PATENT DOCUMENTS

| | | | |
|---|---|---|---|
| 6,021,126 A | 2/2000 | Farris et al. | |
| 6,201,965 B1 * | 3/2001 | Mizell et al. | 455/433 |
| 6,577,643 B1 * | 6/2003 | Rai et al. | 370/466 |
| 6,741,853 B1 * | 5/2004 | Jiang et al. | 455/418 |
| 6,795,444 B1 * | 9/2004 | Vo et al. | 370/401 |
| 2001/0046234 A1 * | 11/2001 | Agrawal et al. | 370/402 |

FOREIGN PATENT DOCUMENTS

| | | |
|---|---|---|
| WO | WO 00 39981 A | 7/2000 |
| WO | WO 01 13601 A | 2/2001 |
| WO | WO 01 54444 A | 7/2001 |

* cited by examiner

*Primary Examiner*—William Trost
*Assistant Examiner*—Danh C Le

(57) ABSTRACT

This invention provides a method intended to solve Number Portability in origin for calls to ported subscribers at a destination classical network, an inter-working function intended to provide the means to support said method, and a hierarchical DNS structure able to provide a new URI indicating interworking with an external database where routing data for said ported subscribers reside. This new URI specifies the Global Title address of the external database and the access protocol to said external database. The NAPTR resolution for that URI implies the use of an Inter-working Feature (IWF) placed in the DNS-resolver part of an S-CSCF, or in a close association, in the originating network. This IWF comprises a Protocol Translator and Controller adapting between DNS format and the external database access protocol format, at least one of a plurality of Application Protocol Handling Modules, and an SS7 Protocol Stack.

29 Claims, 5 Drawing Sheets

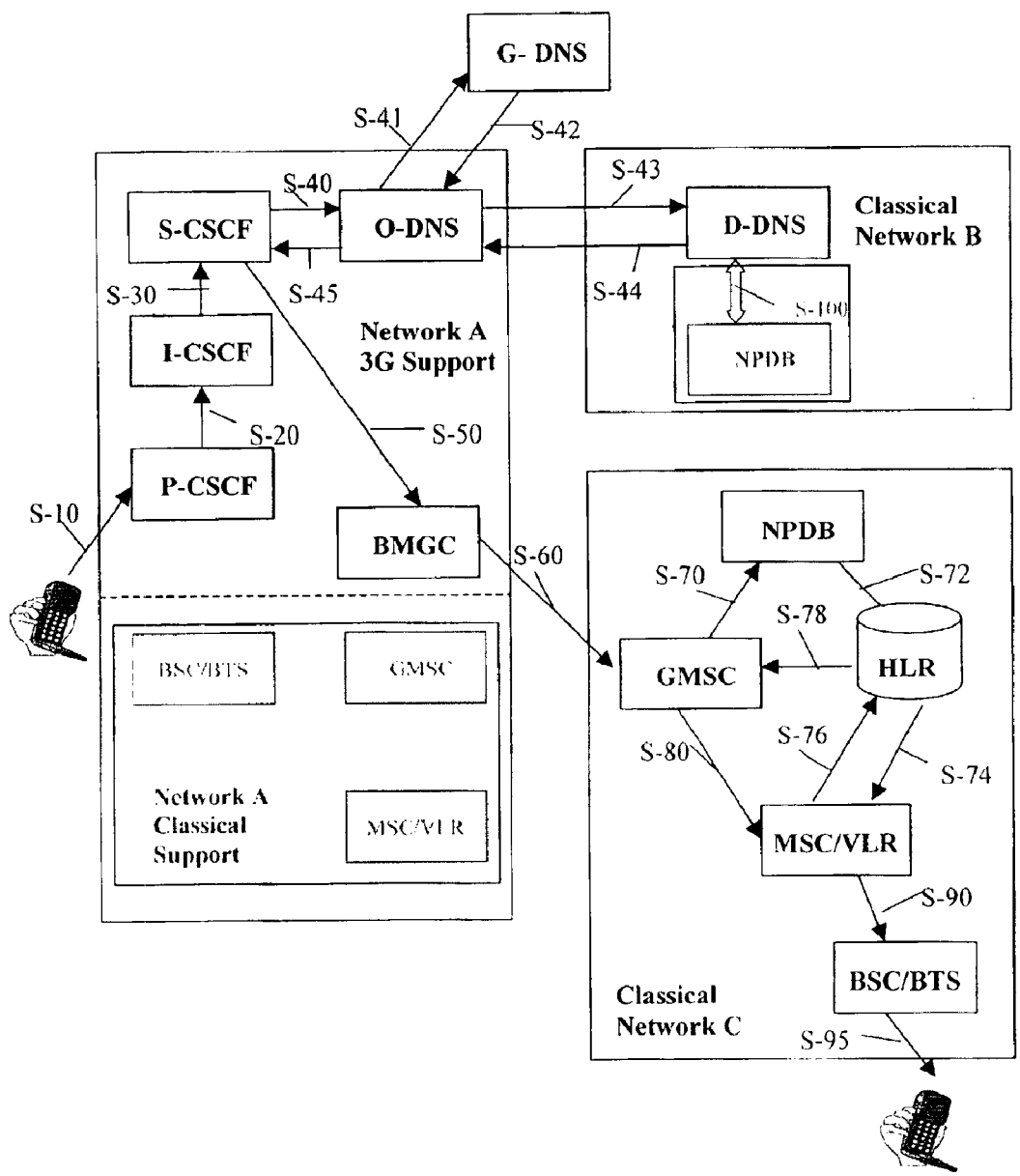
FIG.-1-
Prior Art

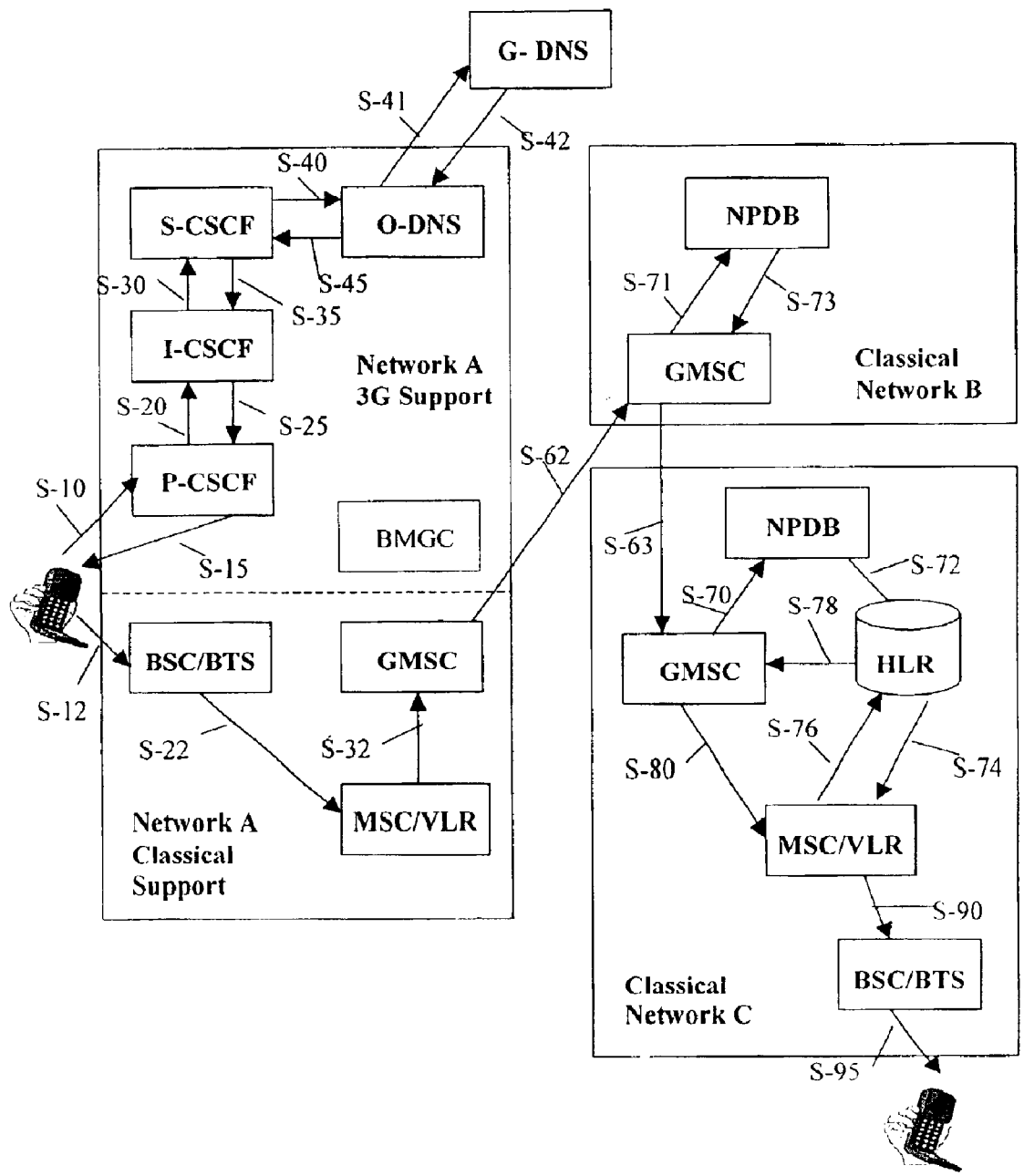
FIG.-2-
Prior Art

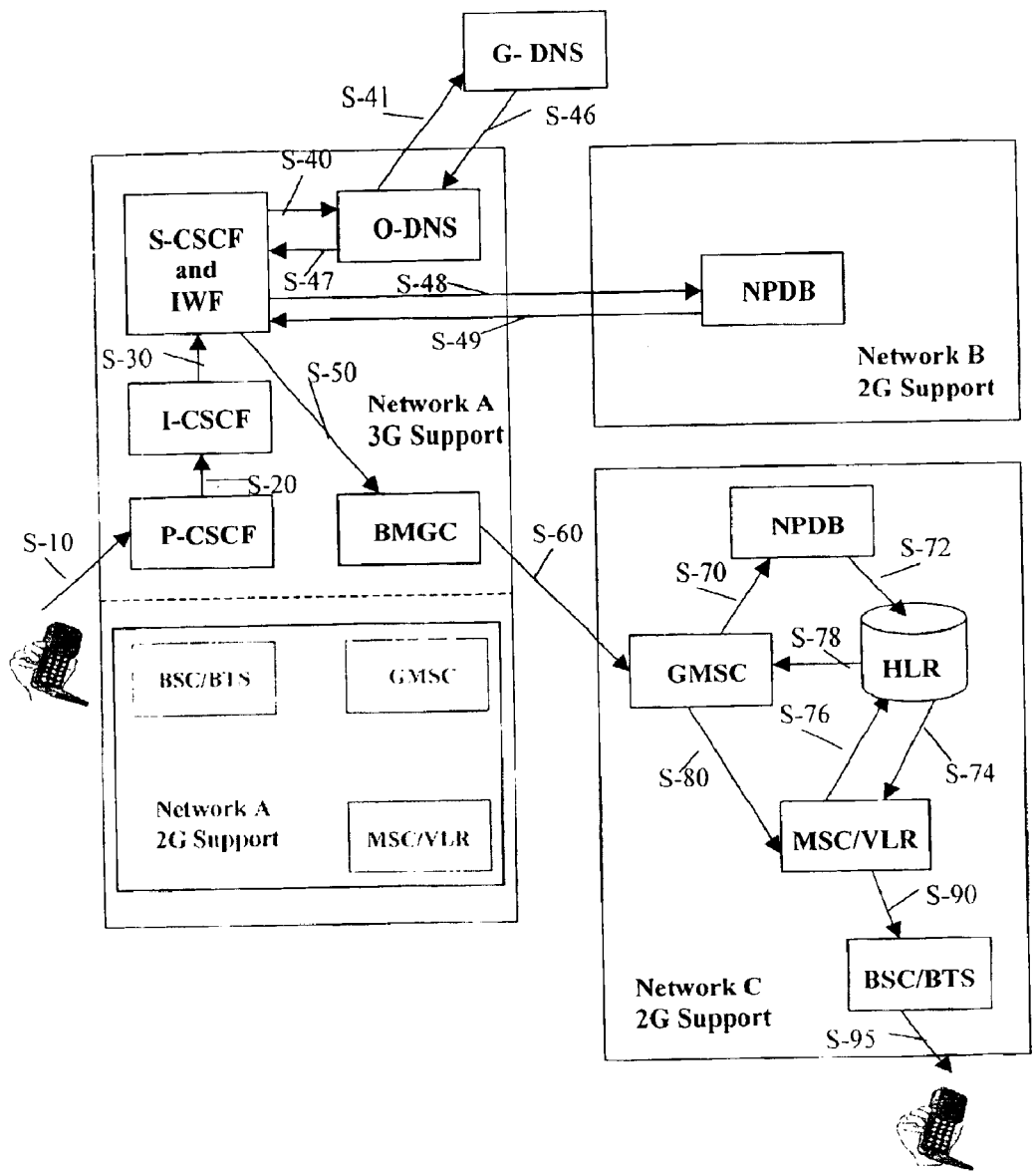
FIG. -3-

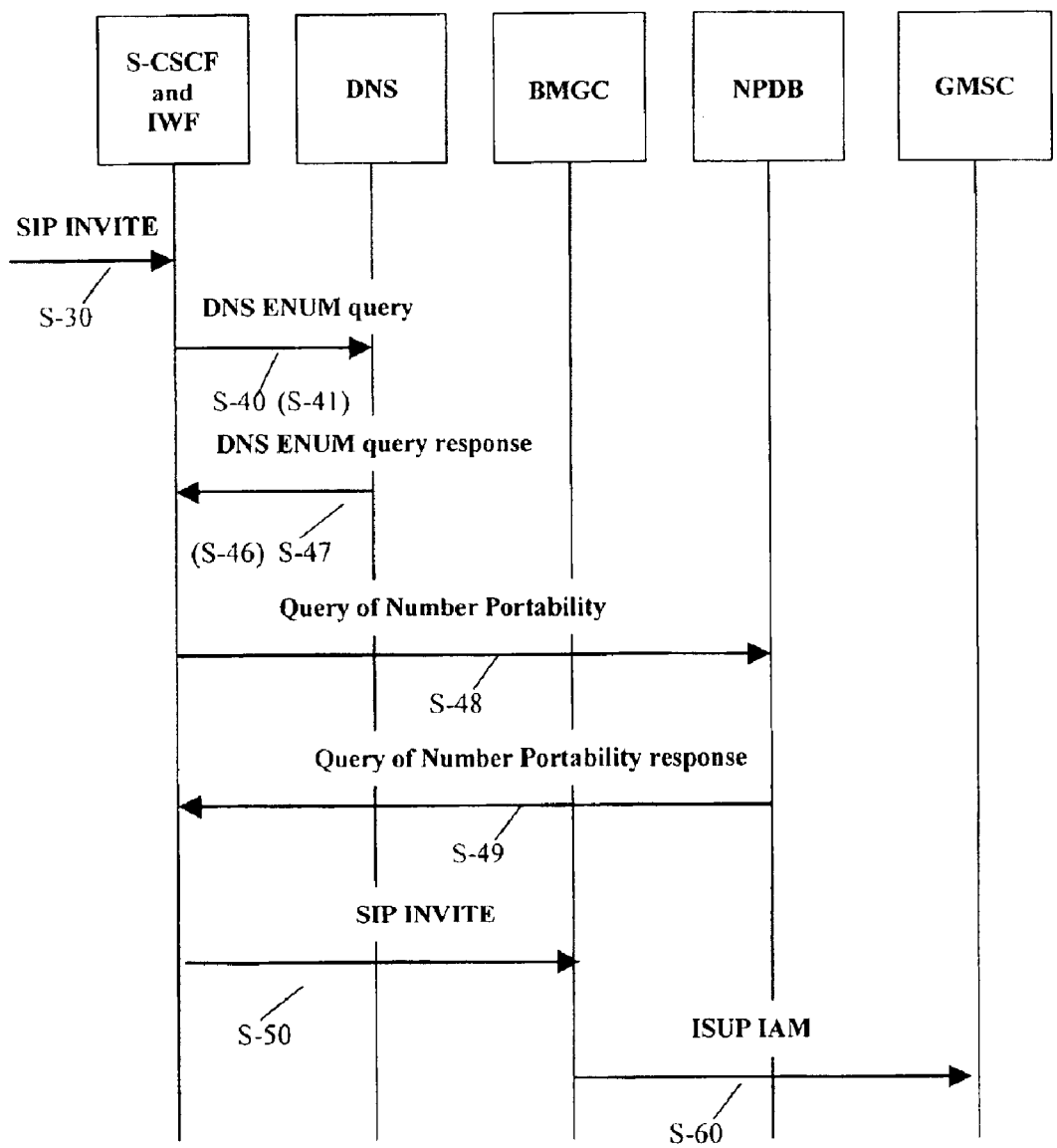
FIG. -4-

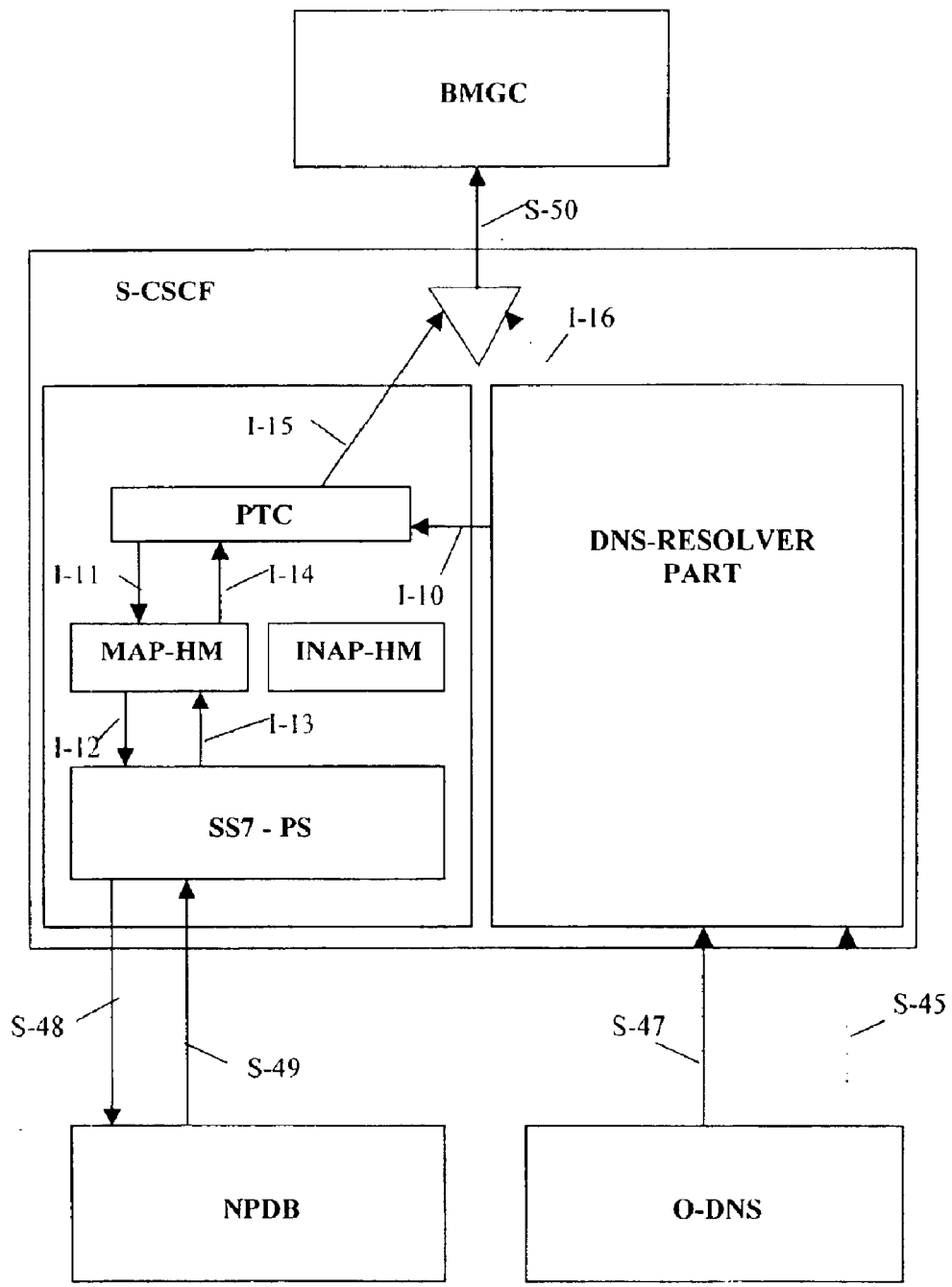
FIG. -5-

METHOD AND APPARATUS FOR SOLVING NUMBER PORTABILITY IN ORIGIN

CROSS REFERENCE TO RELATED APPLICATIONS

This application is related to EPO Application Ser. No. 01202780-1 entitled "Method and Apparatus for Solving Number Portability in Origin," by Vincente de Vega de la Red and Roberto David Carnero Ros, filed Jul. 19, 2001, the entirety of which is incorporated herein by reference. The application claims priority on the aforementioned related EPO application.

BACKGROUND OF THE INVENTION

1. Technical Field

The present invention generally relates to the resolution of Number Portability issues in origin when the calling subscriber belongs to a network based on the Internet Protocol (IP), and the called subscriber is a ported subscriber between Classical networks. More specifically, the calling subscriber belongs to a mobile system of a third generation and, for the purpose of the present invention, a Classical network may be a Public Land Mobile Network (PLMN) of a first or second generation, a Public Switched Telephone Network (PSTN), or an Intelligent Network (IN).

The current development of new mobile communication systems, aimed by the rapidly growth of Internet applications to incorporate new services, makes the interconnection of systems based on previous generations to newer systems be a must. For instance, a third generation mobile system (hereinafter simply referred to as 3G) like the Universal Mobile Telecommunication System (UMTS) has to fully inter-work with the existing mobile systems like GSM. In this respect, said UMTS supports and makes use of the Session Initiation Protocol (SIP) over the Internet Protocol (IP), whereas said GSM makes use of the Mobile Application Part (MAP) protocol over a Signalling System number 7 (SS7) protocol. This is an instance of interconnection of a 3G network to a classical PLMN network. Moreover, a full inter-working between 3G systems and Intelligent Networks (IN) must also be supported, the latter making use of the Intelligent Network Application Part (INAP) protocol over SS7. This is an instance of interconnection of a 3G network with a classical PSTN network.

The current trends and standards generally accepted for 3G networks propose a general purpose Domain Name Server (DNS) to solve the addressing by providing appropriate routing data. Originally, a Domain Name Server (DNS) was intended to provide an Internet address for a given Uniform Resource Locator (URL) included in the query from any client entity. A URL is a certain expression following specific and standard format rules that unambiguously identify a particular server or client. An interested reader is kindly referred to the current version of the "Internet Official Protocol Standards", as well as to appropriate and related working groups of the Internet Engineering Task Forces (IETF).

According to the Request for Comments 1034 (RFC 1034), a domain name identifies a node. Each node has a set of resource information. All the resource information that is associated with a specific name consists of separate Domain Name Server Resource Records (DNS RR). At present, a particular DNS RR called Naming Authority Pointer (NAPTR) specifies rule expressions that applied to the received string produce either a new domain level or a Uniform Resource Identifier (URI) as result, accompanied by appropriate flags to unambiguously interpret such a result. Then, the entity having issued the query will make use of such a new domain level or URI, depending on the flag values, in eventual subsequent queries for NAPTR resource records (NAPTR RR), or as an output of the current process. Details and most of the relevant information with regard to encoding rules, formats and fields related to NAPTR RR can be found in the RFC 2915 of the Network Working Group of IETF organization.

In accordance with said RFC 2915 (and others mentioned per item below), and particularized for the purpose of the present invention, the format of the NAPTR RR comprises the following fields:

Domain: The domain name that this resource record refers to, and "key" for entry in the rule database.

TTL: Time to Live (DNS RR defined in RFC 1034).

Class: It usually takes the value "IN" standing for Internet (DNS RR defined in RFC 1034).

Type: The Type code for NAPTR is 35.

Order: A 16-bit unassigned integer specifying the order in which the NAPTR records must be processed to insure the correct ordering of rules.

Preference: A 16-bit unassigned integer specifying the order in which NAPTR records with equal "order" values should be processed, wherein low numbers are processed before high numbers.

Flags: A character-string used to unambiguously interpret the rest of fields in this resource record. At present, there are four flags, "S", "A", "U" and "P", where the three former denote a terminal lookup. Further, the "U" flag denotes that the next step is not a DNS lookup but rather that there is a URI provided in the "regexp" field.

Service: The service may specify the service itself available through current analysis path or, depending on what the flag fields state, it may also specify the particular protocol to talk with the service.

Regexp: A string containing a substitution expression that applied to the original string is used to construct the next domain name lookup.

Replacement: It indicates the next NAME to query for NAPTR, or Server Location Resource Records (SRV RR), or address records depending on the value of the flag field. In accordance with the RFC 2782 said SRV RR is intended for several purposes. A first purpose is to allow administrators to make use of several servers for a single domain. Another purpose is to allow administrators to move services from one host to another host in an easier way. Still another purpose is to allow administrators to designate some hosts as primary servers for a service, and other hosts as secondary servers.

Also in accordance with said RFC 2915, and particularized for the purpose of the present invention, the basic NAPTR algorithm behaves in such a manner that the meaning of the flags and services imply that the output of one rewrite path is a new key that points to another rule. This looping algorithm allows NAPTR records to specify a complete rule by linking or looping individual incremental rules.

At present, the current trends for solving the addressing in 3G networks assume that an entity responsible for call control in an originating network issues a DNS query toward the corresponding network DNS. Provided that said DNS can resolve the addressing, the corresponding response is returned back to the querying entity responsible for call control. This feature does not offer major drawbacks to resolve addressing for a called subscriber at a classical network whose subscriber number belongs to series owned by his or her operator. However, and specially due to Number Portability support, said DNS could be unable to directly answer, but rather said DNS should submit such a query toward a General DNS on national premises. Said General DNS is supposed to provide addressing data of another DNS belonging to the destination network to which a subsequent query should be issued from the originating DNS. Under these assumptions, an especially relevant scenario turns up when the destination network is a classical network such as a conventional PLMN or PSTN network. Said classical networks nowadays do not comprise, or do not internally need, a DNS for addressing, but rather a more specific Number Portability Database (NPDB) not able to understand a DNS query. In this scenario, the General DNS above cannot provide a destination DNS of a classical network back to the originating DNS for the latter to issue the corresponding new query.

Currently, there is no apparent solution already implemented but, rather, there are several approaches still under discussion and herein described for the sake of clarity as presenting the objects of the present invention.

2. Description of the Related Art

At present, a DNS hierarchical structure is perfectly able to provide an URI indicating a target entity to route a call from the originating entity to a called subscriber whose subscriber number is within number series belonging to his or her operator at a classical network, as already stated. This well known feature can be easily derived from the teaching of Patent Application WO 97/31490, for instance. However, the introduction of Number Portability scenarios in both 3G and classical networks make this solution less feasible since the number series premises are not as valid as before. In this respect, individual entries for particular subscriber numbers, rather than series, have to be considered, at least, at a General DNS on national premises. On the other hand, a quite common scenario generally accepted is that the "donor" network should be responsible for maintaining the information related to the current network where own subscribers have been ported.

A quite simple solution is the introduction of a DNS in all the classical networks or, at least, in all the classical networks having ported subscribers. As shown in FIG. 1, when a 3G subscriber initiates a call [S-10] with a 3G user equipment (UE), the Proxy Call State Control Function (P-CSCF) forwards the SIP message [S-20] received from the UE toward the SIP server most likely via an Interrogating Call State Control Function (I-CSCF). Next, the I-DSCF forwards said SIP request [S-30] to a Serving Call State Control Function (S-CSCF) determined at a previous Registration procedure. Said Registration procedure is not significant at this step for the purpose of the present invention. At this point and in accordance with the 3G Technical Specification 23.228 version 5.0.0, the S-CSCF is supposed to obtain from a certain database the Address of the remote I-CSCF for the network operator serving the destination subscriber from the destination name of the terminating subscriber. This said certain database is currently assumed and mostly accepted as a DNS.

However, this remote I-CSCF of the destination network, whose address is requested from said certain database, does not make any sense for classical networks like a GSM network for instance. Assuming that there is no DNS in classical networks, the fact of supporting Number Portability implies that the current classical network where the terminating subscriber holds his or her subscription cannot be simply derived or solved at said certain database by performing the analysis on subscriber number series premises. Further, given that subscriber number series premises can not be applied for analysis said certain database should contain a huge amount of subscriber names and analysis paths to solve addressing what is close to unfeasible.

The assumption presented in FIG. 1 is that a DNS entity is introduced in these classical networks, the latter behaving as "Donor" networks, namely networks with subscribers ported to other classical network operator. Thereby, said certain database toward which the S-CSCF issues the query [S-40] is a DNS belonging to the originating network [hereinafter referred to as O-DNS]. Given that the destination subscriber does not belong to the originating 3G network, O-DNS submit the query [S-41] to a General DNS on national premises [hereinafter referred to as G-DNS]. Said G-DNS resolves the addressing and returns back [S-42] the address of a DNS belonging to the destination network [hereinafter referred to as D-DNS]. The O-DNS then submits the query [S-43] toward said D-DNS. Notice that a common provisioning of number portability data have to be carried out to both NPDB and said D-DNS at the destination classical network. This common provisioning could be implemented by a clustering between the NPDB and the D-DNS, wherein both serial and broadcast clustering are possible. This D-DNS eventually resolves the addressing returning back [S-44] a valid Routing Number to directly access, without further querying, the natural entry point to the new destination network, that is, the "recipient" network where the destination subscriber was ported. At reception of this Routing Number, the O-DNS returns back [S-45] to the querying S-CSCF said Routing Number to access the current network where the destination subscriber holds his or her subscription. Different and equivalent approaches may turn up at this step without substantial differences to access the destination network. The assumption presented in FIG. 1 is that the S-CSCF routes the call toward a Breakout Media Gateway Controller (BMGC) including the received Routing Number so that said BMGC can appropriately determine which PLMN or PSTN Gateway must be addressed. At present, some trends suggest that said BMGC should comprise a Breakout Gateway Control Function (BGCF) and a Media Gateway Control Function (MGCF), possibly as separate entities. However, for the purpose of the present invention this is not relevant and they both, BGCF and MGCF, can be considered as a unique entity, BMGC, supporting SIP to and from the 3G network, and ISUP to and from classical networks. When the call is received in the BMGC, the destination PLMN or PSTN Gateway is determined from the received Routing Number. Then, the SIP INVITE message received [S-50] at the BMGC from the 3G network is processed to prepare accordingly an ISUP IAM message [S-60] in order to transfer the call to the recipient classical network where the destination subscriber is ported.

The assumption presented in FIG. 1 is that the call is routed [S-60] from said BMGC to the corresponding Gateway Mobile Switching Center (GMSC) of a classical PLMN in accordance with addressing data previously obtained from the D-DNS for the destination ported subscriber. The call received at the GMSC progress from now on in the normal and well-known way. That is, the GMSC requests [S-70] routing data for the ported subscriber to the Number Portability Database (NPDB) of this recipient network and the query is submitted [S-72] to the Home Location Register (HLR) in charge of such subscriber. Then, the HLR requests a Roaming Number [S-74] to the coupled entity Mobile Switching Center and Visitor Location Register (MSC/VLR)

where the subscriber is currently roaming, which returns back [S-76] to the HLR said roaming number. The HLR sends [S-78] the received roaming number to the GMSC, which can now route the call [S-80] to the appropriate MSCNLR, and from there toward [S-90] the Base Station System (BSC/BTS) and to the destination subscriber terminal [S-95].

This solution may solve the number portability procedure though such a solution is essentially based on introducing a DNS in all classical networks from where subscribers have been ported, what represents a quite significant drawback for the corresponding classical network operators. These classical network operators, apart from losing subscribers, should even buy, administer and operate DNS entities only to help 3G network operators. Moreover, said new DNS to be incorporated to classical networks must be closely coupled to the traditional NPDB in said classical networks with a common provisioning of Number Portability data. This Common provisioning solution might consist of a Mediation Device between the Customer Administration Service (CAS) and the Network Elements, namely the nodes that are going to be provisioned. This Mediation Device is responsible for the provision of the same number portability data to both NPDB and DNS nodes. For this purpose, a Network Cluster, defined as a number of network elements holding the same subscriber data, composed of a DNS and a NPDB is needed. This Network Cluster is only required for exclusively number portability data. Requests are distributed to the Network Elements in the cluster according to a Clustering Strategy. The Clustering Strategies can be mainly of two types: Serial Provisioning and Broadcast. In Serial Provisioning one Network Element is configured as primary and the other as redundant; therefore the Mediation Device sends the service order first to the primary, and waits for a response code. Afterwards, it will send the service order to the secondary. On the other hand, in Broadcast strategy the same command is sent to all the Network Elements in the cluster at the same time.

Notice that this and other equivalent or similar solutions would be necessary for a classical network operator supporting Number Portability in order to introduce a DNS to help 3G network operators, rather than due to classical network needs.

To overcome this and other drawbacks, derived from introducing a DNS in all classical networks to help 3G networks to solve in origin the Number Portability, is one of the objects of the present invention.

In this respect, another solution to solve Number Portability in origin in 3G networks, without forcing classical networks to include a DNS, proposes to carry out the breakdown between 3G and classical networks in the 3G terminals. That is, these terminals should be able to support 3G and Classical Services capabilities. Moreover, 3G networks must have a classical network infrastructure to handle new calls once the terminal switches from 3G to classical service capabilities. As shown in FIG. 2, when a 3G subscriber initiates a call [S-10] with a 3G user equipment (UE), the P-CSCF forwards the SIP message [S-20] toward the SIP server likely via an I-CSCF. Next, the I-CSCF forward said SIP request [S-30] to the S-CSCF. The S-CSCF issues a DNS query [S-40] to the O-DNS. Given that the destination subscriber does not belong to the originating 3G network, O-DNS submits the query [S-41] to the G-DNS on national premises. So far, this solution looks like the previous one; however, the assumption is now that the G-DNS can not resolve the requested addressing query for a classical network entity. Said G-DNS returns back [S-42] an unsuccessful result to the querying entity, the O-DNS, which in turn generates another query response accordingly and sends it back [S-45] to the S-CSCF. At receipt of the query response, the S-CSCF generates a SIP REDIRECT message to simply return such unsuccessful result [S-35] back to the I-CSCF which transfers [S-25] such message and result back to the P-CSCF, and from the latter an appropriate unsuccessful result is submitted [S-15] to the 3G UE. This solution basically proposes that said 3G UE performs the call breakdown toward the classical network. Consequently, all the process following the breakdown is absolutely in accordance with the current behavior of such classical networks, for example PLMN or PSTN.

For instance, the assumption in FIG. 2 is that the 3G operator also has infrastructure for a conventional PLMN, and that the call has to be routed toward a classical "recipient" network C via the "donor" network B.

As presented in FIG. 2, the process followed to route the call from the originating network A to the "donor" network B [S-12, S-22, S-32, S-62] is absolutely in accordance with the current behavior of a traditional GSM system in a scenario where number portability is supported. Similarly, the process followed to route the call from the "donor" network B to the "recipient" network C [S-71, S-73, S-63] is also in accordance with said behavior of GSM systems. And eventually, the process to route a call received at a "recipient" classical network for a ported subscriber to reach the corresponding subscriber terminal [S-70, S-72, S-74, S-76, S-78, S-80, S-90, S-95] is also in accordance with said behavior of GSM systems.

This solution, compared to the previous one, offers the advantage of not imposing the introduction of DNS entities in classical networks. However, it still presents the clear drawback of introducing dependencies on the 3G UE that 3G operators and subscribers have to respectively support and make use of.

It is an object of the present invention to overcome these dependencies from the 3G user equipment. That is, it is an object of the present invention to offer a solution that gives freedom to terminal suppliers in order to implement said terminals with or without support for classical network capabilities. Besides, it is an object of the present invention to offer a solution that gives freedom to the 3G subscribers to choose their own 3G terminal without unnecessary constraints. Moreover, it is an object of the present invention to offer a solution that gives freedom to the 3G operators to support services and subscriptions without unnecessary constraints derived from dependencies on user equipment.

Furthermore, these objects of the present invention are achieved accordingly with the aforementioned object of the present invention to offer a solution that does not impose the introduction of DNS entities in classical networks in order to help 3G networks to solve in origin number portability issues.

SUMMARY OF THE INVENTION

To accomplish these and other objects, the present invention provides a method intended to solve Number Portability in origin for calls to ported subscribers at a destination classical network, an inter-working function intended to provide the means to support said method, and a hierarchical DNS structure able to provide a new URI indicating inter-working with an external database where routing data for said ported subscribers reside.

Said method, carried out in Telecommunications systems comprising at least a call originating network and at least a call destination classical network with ported subscribers, beginning nowadays with the step of:

a) Issuing a DNS-query in the call control entity of the call originating network toward a hierarchical DNS structure in order to resolve addressing for the ported called subscriber, the method further comprising in accordance with the invention the steps of:

b) Receiving at said call control entity from the hierarchical DNS structure addressing data including:
   an indicator of inter-working with a external database containing ported called subscriber data;
   a first parameter indicating the Global Title address of the external database that must be further inquired; and
   a second parameter indicating the protocol required for accessing said external database;

c) Inquiring said external database about routing data for the ported called subscriber, said external database being addressed by the Global Title indicated in said first parameter at step (b), and said external database being accessed by the protocol indicated in said second parameter at step (b), both first and second parameters included in previous DNS answer; and d) Mapping the ported called subscriber routing data received from the external database to an appropriate DNS answer indicating routing of an originating call, for further determining the appropriate gateway to proceed with the call toward the called subscriber at a classical network.

In particular, the addressing data received as a DNS-answer at step (b) is a NAPTR RR that comprises a new URI indicating the need for inter-working, a "NAPTR Regexp" field indicating the Global Title address of the external database, and a "NAPTR Service" field indicating the protocol required for accessing said external database. Then, the external database inquired at step (c) is addressed by said Global Title indicated in "NAPTR Regexp" field, and said external database is accessed by the protocol indicated in "NAPTR Service" field, both NAPTR fields comprised in previous DNS answer. As receiving routing data from said external database for the ported called subscriber, the appropriate DNS-answer mapped from said routing data at step (d) is a "tel" URL indicating routing of the originating call. Further, said "tel" URL mapped from routing data of a ported called subscriber is submitted in a SIP_INVITE message toward a Breakout Gateway Control Function or toward a Media Gateway Control Function to further proceed with the call.

Apart from said method in a Telecommunication system comprising at least a call originating network and at least a call destination classical network with ported subscribers, there is also provided an Inter-Working Function. Said Inter-Working Function comprises at least one of a plurality of Application Protocol Handling Modules and an SS7 Protocol Stack, and further comprises in accordance with the invention a Protocol Translator and Controller having:

a) Means for receiving from the DNS-resolver part at a call control entity an indicator of inter-working with a external database, a first parameter indicating the Global Title address of the external database that must be further inquired, and a second parameter indicating the protocol required for accessing said external database;

b) Means for inquiring said external database about routing data for a called subscriber ported from a "donor" to a "recipient" classical network, said external database being addressed by the Global Title indicated in said first parameter at step (a), and said external database being accessed by the protocol indicated in said second parameter at step (a), both first and second parameters included in previous DNS answer; and c) Means for mapping the called subscriber routing data, received from the external database via the SS7-SP and the corresponding Application Protocol Handling Module, to an appropriate DNS answer indicating routing of an originating call, said DNS answer being processed at the call control entity.

In particular, the means (a) above are arranged for receiving a new URI indicating the need for inter-working, a "NAPTR Regexp" field indicating the Global Title address of the external database, and a "NAPTR Service" field indicating the protocol required for accessing said external database. Then, the means (b) above for inquiring the external database further comprise:

b1) Means for adapting the Global Title indicated in a received "NAPTR Regexp" field to appropriate protocol parameter suitable for the protocol indicated in a received "NAPTR Service" field;

b2) Means for selecting an Application Protocol Handling Module suitable for the protocol indicated in a received "NAPTR Service" field; and b3) Means for ordering the selected Application Protocol Handling Module the invocation of a protocol operation suitable for the protocol indicated in a received "NAPTR Service" field and appropriate for inquiring about routing data of a called subscriber;

Both "NAPTR Regexp" and "NAPTR Service" fields comprised in previous DNS answer. Next, the means (c) above are arranged for mapping the called subscriber routing data received from the external database to an appropriate "tel" URL indicating routing of the originating call as if it were answered from a DNS.

Eventually, the aforementioned method and Inter-Working Function require a Domain Name Server having NAPTR Resource Records for addressing resolution purposes. Said NAPTR Resource Records implement in accordance with the invention a new URI indicating the need for requesting data stored in an external database containing ported called subscriber data, said new URI associated to the address and protocol for accessing said external database.

A quite common scenario for applying the invention is a call originated in a 3G network being the called subscriber ported from a donor classical network to a recipient classical network, both classical networks being GSM based PLMN networks. The call reaches a call control entity, which under this assumption is a Call State Control Function, from where a DNS-query is performed. The corresponding DNS-answer is received at the DNS-resolver part of said call control entity. The received new URI indicates a further query to an external database whose address is indicated in the received "NAPTR Regexp" field. In this case, the received "NAPTR Service" field indicates the MAP protocol to access the Number Portability Database where routing data for the ported called subscriber can be fetched.

As anyone skilled in the art can straightforwardly appreciate, the method, inter-working function, and extended Domain Name Server capabilities in accordance with the invention can be applied to other scenarios than 3G versus classical network related, and involving other protocols than MAP or INAP for accessing the external database. Moreover, the indication of the protocol for accessing said external database, could also be given under a protocol-type scheme that the definition of a new URI allows.

BRIEF DESCRIPTION OF THE DRAWINGS

The features, objects and advantages of the invention will become apparent by reading this description in conjunction with the accompanying drawings, in which:

FIG. 1 basically illustrates a block diagram and relevant interfaces showing how Number Portability in a Classical network can be solved in origin from a 3G network with the introduction of a DNS in said Classical network.

FIG. 2 basically illustrates a block diagram and relevant interfaces showing how Number Portability in a Classical network can be solved in origin from a 3G network by introducing capabilities in 3G terminals to breakdown the call to classical network infrastructure comprised in said 3G network.

FIG. 3 presents a simplified block diagram and relevant interfaces showing how Number Portability in a Classical network can be solved in origin from a 3G network by introducing a new URI in an existing network DNS, and an Inter-Working Function in an existing call control entity.

FIG. 4 presents a simplified flow diagram showing how Number Portability in a Classical network can be solved in origin from a 3G network by introducing a new URI in an existing network DNS, and an Inter-Working Function in an existing call control entity.

FIG. 5 shows a simplified view of a preferred location and interfaces for the InterWorking Function proposed in accordance with the present invention.

DETAILED DESCRIPTION OF PREFERRED EMBODIMENTS

This preferred embodiment describes a method and apparatus required accomplishing with the aforementioned objects of the present invention. Specifically, this preferred embodiment explains how to route a call from a 3G network to classical networks where the called subscriber holds his or her current subscription, being said called subscriber a ported subscriber, or being said called subscriber a normal subscriber never ported from his or her original network. The objects of the present invention are accomplished by reaching said called subscriber at a classical network, and by neither forcing to introduce a DNS entity in said classical networks, nor imposing breakdown capabilities between 3G and classical networks on the 3G terminals.

In brief, and accordingly with FIG. 3, this invention discloses the inter-working between 3G domain and Classical Networks domains during the address resolution process started in the O-DNS. This implies a new URI indicating the need of inter-working, an apparatus called Inter-Working Feature (hereinafter referred to as IWF) for doing the queries to the external database containing called subscriber data, and a method to effectively carry out the addressing resolution process. Said external database of a classical network being accessed via application level protocols over an SS7 stack, like Mobile Application Part (MAP) or Intelligent Network Application Part (INAP). More specifically, this external database can be a Number Portability Database (NPDB) at classical networks supporting number portability or a general subscriber database at a classical network where number portability is not supported.

FIG. 3 and FIG. 4 represent a call scenario wherein a certain 3G subscriber calls to a Classical Services subscriber that has been ported from a Classical Services "donor" network to another Classical Services "recipient" network. In this context, a Classical Services network represents a classical network as normally referred to throughout this document. In such a scenario, the O-DNS alone or with co-operation of a G-DNS on national premises could need to do a query to an external Database, namely a NPDB, to resolve the addressing of the called party. This query may imply the use of a protocol different than DNS.

As shown in FIG. 3 and FIG. 4, a 3G calling subscriber dials an E.164 number to initiate a call [S-10] in a 3G network. By means of a process described in 3GPP TS 23.228, the call is handled through P-CSCF and I-CSCF [S-20], and reaches [S-30] the S-CSCF of the originating network. That is, said S-CSCF receives a SIP INVITE message, with a "tel" URL indicating the called party, intended for requesting to establish a session toward a called subscriber identified by an E.164 number. Then, the S-CSCF starts the address resolution [S-40] toward the O-DNS using ENUM accordingly with the RFC 2916 teaching. At this step, the O-DNS itself, or in co-operation with a national G-DNS [S-41, S-46], performs the address resolution. In accordance with an aspect of the present invention, the O-DNS returns [S-47] back to the S-CSCF a new URI "gt", further described throughout this preferred embodiment, from an applicable NAPTR RR, along with a Global Title address and an indication about the protocol to be used. The DNS-resolver part of the S-CSCF receives such URI "gt" with a Global Title address and an access protocol like, for instance, MAP for a called subscriber of a classical PLMN.

Anyone skilled in the art can easily encounter a similar applicability for a called subscriber belonging to a classical Intelligent Network, where the applicable protocol would be INAP.

The reception of this new URI "gt" at the DNS-resolver part is understood as an implicit invitation to transfer the query control to the Inter-Working Function part (IWF) intended for performing a lookup into the external database of a classical network like, for instance, an NPDB. Then, the IWF of said S-CSCF prepares a MAP operation SEND_ROUTING_INFO to be submitted [S-48] according to MAP protocol, over SS7 protocol Stack means, toward the corresponding NPDB, assuming a called subscriber belonging to a classical PLMN.

Provided that the classical network is an Intelligent Network accessed via INAP protocol, the external database to be consulted would be a Service Control Point (SCP), and the IWF sends [S-48] the INAP operation INITIAL_DP toward said SCP.

As receiving said MAP operation SEND_ROUTING_INFO at the NPDB, said classical network database behaves as nowadays, accordingly to applicable standards like GSM for instance, and without any impact derived from inter-working with a 3G network, what achieves one of the objects of the present invention. Next, said NPDB returns [S-49] back to the IWF of the S-CSCF the expected MAP operation result including the requested Routing Number, which may be given a network prefix for a ported subscriber, so that the call can be appropriately routed toward the current "recipient" network. The IWF receives the response of the NPDB with the number portability information, maps the number portability received onto a "tel" URL, and the S-CSCF can eventually route the call toward the current "recipient" classical network in which the called subscriber has his or her subscription. To this end, the S-CSCF sends [S-50] this "tel" URL in a SIP_INVITE protocol message toward the BMGC. The BMGC can now determine which PLMN or PSTN Gateway must be addressed. When the call is received in the BMGC, the destination PLMN or PSTN Gateway is determined from the received Routing Number as previously described when commenting the procedure illustrated in FIG. 1. That is, the SIP INVITE message received [S-50] at the BMGC from the 3G network is processed to prepare accordingly an ISUP IAM message [S-60] in order to transfer the call to the "recipient" classical network where the destination subscriber is ported.

Thereof, number portability has been solved in originating network without introducing any DNS entity into classical networks supporting number portability, and without 3G terminals responsible for carrying out the breakdown between 3G and classical networks, accomplishing the objects of the present invention.

Instead of introducing a DNS entity in all classical networks supporting number portability, the proposal of the present invention is the implementation of the aforementioned method with the support and definition of a new URI for managing Global Title (GT) addresses. Such new URI is intended to indicate that a new query shall be carried out to an external database containing called subscriber data, by making use of an also indicated non-DNS related protocol. For the purpose of the present description and in a non-restricted manner, said non-DNS related protocol is at least one of MAP or INAP.

In accordance with an aspect of the present invention, this new URI is named "gt" and is defined in NAPTR RR preferably of a national DNS like the G-DNS per each national number portability database. Alternatively, as anyone skilled in the art can easily appreciate, said new URI "gt" could also be defined in NAPTR RR of the O-DNS as well. The different GT number series can be associated to said national number portability database by means of DNS CNAME Resource Records.

The definition of this new URI "gt" is, in accordance with the present invention, based on the Augmented Backus-Naur Form (ABNF) notation as presented in RFC 2234, and its syntax is formally described as follows:

```
globaltitle-uri = globaltitle-scheme ":" globaltitle-set
globaltitle-scheme = "gt"
globaltitle-set = globaltitle-element ";" protocol-part
globaltitle-element = (nai-part gtaddress-part)/(tt-part gtaddress-part)/
    (tt-part np-part gtaddress-part)/(tt-part np-part nai-part
    gtaddress-part)
tt-part = 1*3(globaltitle-digit)
    ; Translation Type
np-part = 1*2(globaltitle-digit)
    ; Numbering Plan
nai-part = 1*3(globaltitle-digit)
    ; Nature of Address Indicator
gtaddress-part = 1*15(globaltitle-digit)
    ; Global Title Address
globaltitle-digit = DIGIT/visual-separator
visual-separator = "-"/"."/"*"/"("/")"
protocol-part = protocol-scheme "=" protocol-type
protocol-scheme = "protocol"
protocol-type = "map"/"inap"
```

With this data definition and provided that, for instance, the E.164 number series +34 6322 and +34 6723 belong to a certain operator "B". The National DNS (G-DNS) will have, in accordance with the present invention, the following Resource Records associated to the number series:

2.2.3.6.4.3.e164.arpa IN CNAME map.operatorB.es 3.2.7.6.4.3.e164.arpa IN CNAME map.operatorB.es map.operatorB.es IN NAPTR "u" "map+I2G" "!^.*$!gt:1234;protocol=map!"

inap.operatorB.es IN NAPTR "u" "inap+I2G" "!^.*$!gt:5678;protocol=inap!"

Under this assumption and according to the aforementioned procedures and means illustrated in FIG. 3, a subscriber of a certain 3G network operator "A" initiates a call establishment [S-10] toward a subscriber of a certain classical network operator "B" whose number is included in E.164 number series +34 6322. By means of ENUM (RFC 2916), the originating DNS (O-DNS) requires [S-41] from the National DNS (G-DNS) the resolution of the addressing for the dialed number. The National DNS (G-DNS) responds [S-46] a NAPTR RR with an URI "gt" in the NAPTR Regexp field indicating the Global Title address of the node that must be requested, and also indicating in the NAPTR Service field the protocol to access said node. Such response is transmitted back [S-47] from the O-DNS. Then the DNS-resolver part of the S-CSCF in the 3G network "A" requests the IWF to perform an external query [S-48] with the indicated protocol toward the database whose address is indicated by said "gt" URI. The response from said external database with said indicated protocol [S-49], namely the required number portability information, will contain the routing number of the called party.

Apart from what has been heretofore stated about the definition of this new "gt" URI, other fields of the NAPTR RR should, in accordance with another aspect of the present invention, be given particular values to better accomplish the expected result. Said particular values per NAPTR RR field are as follows:

NAPTR Flag will be "u";

NAPTR Service will be "map+I2G" or "inap+I2G";

NAPTR Regexp field will be "gt: Global Title; protocol= protocol type";

Moreover, as specified in RFC 2915 the list of valid Resolution Services must be defined whenever a new application is introduced based on individual NAPTR. Therefore and for the sake of clarity, the new corresponding service "I2G" is, in accordance with the present invention, specified in terms of applicable fields and appropriate values as follows:

I2G (URI to Global Title)
  Name: URI to Global Title
  Mnemonic: I2G
  Number of Operands: 1
  Type of Each Operand: First operand is a URI
  Format of Each Operand: First operand is encoded as a URI.
  Algorithm: Opaque
  Output: One and only one Global Title
  Errors Conditions:
    Malformed URI o URI is syntactically valid but does not exist in any form
    URI exists but there is no available output from this operation
    URI existed in the past but nothing is currently known about it
    Access denied
  Security Considerations:
    Malicious Redirection: One of the fundamental dangers related to any service such as said I2G is that a malicious entry in a DNS where this new "gt" URI has been defined will cause the clients to resolve the URI into the wrong Global Title. The possible intent may be to cause the client to retrieve a resource containing fraudulent or damaging material
    Denial of Service: By removing the Global Title to which the URI maps, a malicious intruder may remove the client's ability to retrieve the resource In summary, this new service of a NAPTR is used in accordance with an aspect of the present invention to map a single URI to a single Global Title. In other words, clients that need to obtain a Global Title for addressing an external node can use said service. External node, understood in a broad sense, implies the use of a DNS or a non-DNS related protocol. The algorithm for this mapping is dependent on the URI scheme.

Moreover, the usage of said "gt" URI does not need that an E.164 has been dialed and, consequently, the use of ENUM in the DNS resolution process is not essential. For example, for a usual domain name like "operator.com", transmitted via a SIP INVITE from a terminal to the S-CSCF, the request of NAPTR resource records could result in a "gt" URI. In this case, the DNS-resolver part of an S-CSCF must inquire to an external database, addressed by the Global Title given by said "gt" URI, and which now could be any protocol other than MAP or INAP, and said "gt" URI can also indicate how to proceed. The external database would contain the routing numbers for the domain names dialed. For the purposes of this invention, the usage of said "gt" URI described in this paragraph is merely illustrative of other possible use cases. However, the introduction of not MAP or INAP based NPDB in the current Classical Services networks implies the aforementioned disadvantages explained for the introduction of a DNS in the Classical Services network. Nevertheless, the main advantage of such a solution is that a subscriber in the Classical Services network can be identified from the 3G network by means of either an E.164 number or a domain name.

Still another aspect of the present invention is the IWF. Said IWF is responsible for queries toward an external database like NPDB in a PLMN, or an SCP in an Intelligent Network, to fetch number portability data of a subscriber ported between classical networks. In accordance to current 3GPP Specification 23.228 v5.0.0 teaching, this IWF should preferably be included in the S-CSCF of the originating network responsible for DNS queries, and from where the call will be transmitted toward the appropriate BMGC. Moreover, this IWF could be included within the DNS-resolver part of said S-CSCF, or in close association to said DNS-resolver part. However, as anyone skilled in the art would easily understand, there will not be any major drawback on considering said IWF an isolated entity sharing a dedicated interface with the S-CSCF, or other arrangements that do not substantially differ from being collocated with the DNS-resolver part within the S-CSCF entity. As shown in FIG. 5, the IWF comprises a Protocol Translator and Controller (hereinafter referred to as PTC), a MAP Handling Module (hereinafter referred to as MAP-HM), an INAP Handling Module (hereinafter referred to as INAP-HM), and an SS7 Protocol Stack (hereinafter referred to as SS7-PS). When the DNS-resolver part of the S-CSCF receives the NAPTR with the proposed "gt" URI [S-47], said DNS-resolver part invokes [S-48] via the IWF [I-10, I-11, I-12] the request of number portability information with the indicated protocol to the external database addressed by the given Global Title. Provided that the "donor" network is a GSM network and contains the number portability information in a NPDB, the IWF sends the MAP operation SEND_ROUTING_INFO toward said NPDB. On the other hand, provided that the "donor" network is an Intelligent Network and contains the number portability information in an SCP, for instance, the IWF sends the INAP operation INITIAL_DP toward said SCP. The number portability information returned [S-49] to the PTC at the IWF via SS7-PS [I-13] and corresponding protocol Handling Module [I-14]. The received number portability information is mapped to an appropriate "tel" URL, and sent [I-15] toward the main S-CSCF part as if it were obtained [I-16] from a normal DNS-query answer [S-45]. Eventually, the S-CSCF sends [S-50] this "tel" URL to the BMGC where the call will proceed toward the terminating classical network.

What is claimed is:

1. A method in a telecommunications system, the telecommunications system comprising at least a call originating network and at least a call destination classical network with ported subscribers, the method providing a number portability service in origin for calls to ported subscribers at the destination classical network, beginning with the step of:
    a) Issuing a DNS-query from the call control entity of the call originating network toward a hierarchical DNS structure in order to resolve addressing for the ported called subscriber,
    the method characterized in that it further comprises the steps of:
    b) Receiving at said call control entity from the hierarchical DNS structure addressing data including:
        an indicator of inter-working with a external database containing ported called subscriber data;
        a first parameter indicating the Global Title address of the external database that must be further inquired; and
        a second parameter indicating the protocol required for accessing said external database;
    c) Inquiring said external database about routing data for the ported called subscriber, said external database being addressed by the Global Title indicated in said first parameter at step (b), and said external database being accessed by the protocol indicated in said second parameter at step (b), both first and second parameters included in previous DNS answer; and
    d) Mapping the ported called subscriber routing data received from the external database to an appropriate DNS answer indicating routing of an originating call, for further determining the appropriate gateway to proceed with the call toward the called subscriber at a classical network.

2. A method according to claim 1, wherein the addressing data received at step (b) is a NAPTR RR that comprises a new URI indicating the need for inter-working, a "NAPTR Regexp" field indicating the Global Title address of the external database, and a "NAPTR Service" field indicating the protocol required for accessing said external database.

3. A method according to claim 2, wherein the protocol indicated in "INAPTR Service" for accessing the external database is MAP.

4. A method according to claim 2, wherein the protocol indicated in "NAPTR Service" for accessing the external database is INAP.

5. A method according to claim 1, wherein the external database inquired at step (c) is addressed by the Global Title indicated in "NAPTR Regexp" field, and said external database being accessed by the protocol indicated in "NAPTR Service" field, both NAPTR fields comprised in previous DNS answer.

6. A method according to claim 5, wherein the external database is inquired about ported called subscriber routing data by invoking the MAP operation SEND ROUTING INFO.

7. A method according to claim 5, wherein the external database is inquired about ported called subscriber routing data by invoking the INAP operation INITIAL DP.

8. A method according to claim 1, wherein the appropriate DNS answer mapped at step (d), from the received ported called subscriber routing data, is a "tel" URL indicating routing of the originating call.

9. A method according to claim 8, wherein the routing data of a port called subscriber, mapped to a "tel" URL, were obtained from an external database as a result of invoking the MAP operation SEND ROUTING INFO.

10. A method according to claim 9, wherein the "tel" URL mapped from routing data of a ported called subscriber is submitted in a SIP INVITE message toward a Breakout Gateway Control Function or toward a Media Gateway Control Function to further proceed with the call.

11. A method according to claim 8, wherein the routing data of a ported called subscriber, mapped to a "tel" URL, were obtained from an external database as a result of invoking the INAP operation INITIAL DP.

12. A method according to claim 1, wherein the call control entity is a SIP Server.

13. A method according to claim 1, wherein the call control entity is a Call State Control Function.

14. A method according to claim 13, wherein the Call State Control Function acts as a Serving Call State Control Function.

15. An Inter-Working Function in a telecommunications system, the telecommunications system comprising at least a call originating network and at least a call destination classical network with ported subscribers, the call originating network having a number portability service in origin for calls to ported subscribers at classical networks, the Inter-Working function comprising at least one of a plurality of Application Protocol Handling Modules and an SS7 Protocol Stack, characterized in that it further comprises a Protocol Translator and Controller having:

a) Means for receiving from the DNS-resolver part at a call control entity an indicator of inter-working with an external database, a first parameter indicating the Global Title address of the external database that must be further inquired, and a second parameter indicating the protocol required for accessing said external database;

b) Means for inquiring said external database about routing data for a called subscriber ported from a "donor" to a "recipient" classical network, said external database being addressed by the Global Title indicated in said first parameter at step (a), and said external database being accessed by the protocol indicated in said second parameter at step (a), both first and second parameters included in previous DNS answer; and c) Means for mapping the called subscriber routing data, received from the external database via the SS7-SP and the corresponding Application Protocol Handling Module, to an appropriate DNS answer indicating routing of an originating call, said DNS answer being processed at the call control entity.

16. An Inter-Working Function according to claim 15, wherein the means (a) are arranged for receiving a new URI indicating the need for inter-working, a "NAPTR Regexp" field indicating the Global Title address of the external database, and a "NAPTR Service" field indicating the protocol required for accessing said external database.

17. An Inter-Working Function according to claim 16, wherein the protocol indicated in "NAPTR Service" field suitable for accessing the external data base is MAP.

18. An Inter-Working Function according to claim 16, wherein the protocol indicated in "NAPTR Service" field suitable for accessing the external database is INAP.

19. An Inter-Working Function according to claim 15, wherein the means (b) for inquiring the external database further comprise:

b1) Means for adapting the Global Title indicated in a received "NAPTR Regexp" field to appropriate protocol parameter suitable for the protocol indicated in a received "NAPTR Service" field;

b2) Means for selecting an Application Protocol Handling Module suitable for the protocol indicated in a received "NAPTR Service" field; and b3) Means for ordering the selected Application Protocol Handling Module the invocation of a protocol operation suitable for the protocol indicated in a received "NAPTR Service" field and appropriate for inquiring about routing data of a called subscriber;

Both "NAPTR Regexp" and "NAPTR Service" fields comprised in previous DNS answer.

20. An Inter-Working Function according to claim 19, wherein the selected Application Protocol Handling Module is the MAP Protocol Handling Module.

21. An Inter-Working Function according to claim 19, wherein the protocol operation appropriate for inquiring about routing data of a called subscribe is the MAP operation SEND ROUTING INFO.

22. Inter-Working Function according to claim 19, wherein the selected Application Protocol Handling Module is the INAP Protocol Handling Module.

23. An Inter-Working Function according to claim 19, wherein the protocol operation appropriate for inquiring about routing data of a called subscriber is the INAP operation INITIAL-DP.

24. An Inter-Working Function according to claim 15, wherein the means (c) are arranged for mapping the called subscriber routing data received from the external database to an appropriate "tel" URL indicating routing of the originating call as if it were answered from a DNS.

25. An Inter-Working Function according to claim 24, wherein the routing data of a ported called subscriber, mapped to a "tel" URL, were obtained from an external database as a result of invoking the MAP operation SEND ROUTING INFO.

26. An Inter-Working Function according to claim 24, wherein the routing data of a ported called subscriber, mapped to a "tel" URL, were obtained from an external database as a result of invoking the INAP operation INITIAL DP.

27. An Inter-Working Function according to claim 15, wherein the call control entity is a SIP Server.

28. An Inter-Working Function according to claim 15, wherein the call control entity is a Call State Control Function.

29. An Inter-Working Function according to claim 28, wherein the Call State Control Function acts as a Serving Call State Control Function.

* * * * *

UNITED STATES PATENT AND TRADEMARK OFFICE
CERTIFICATE OF CORRECTION

PATENT NO. : 6,873,849 B2  
APPLICATION NO. : 10/196633  
DATED : March 29, 2005  
INVENTOR(S) : Vincente de Vega de la Red et al.

Page 1 of 1

It is certified that error appears in the above-identified patent and that said Letters Patent is hereby corrected as shown below:

On the Title Page, Field (73), under "Assignee", in Column 1, Line 1, after "Ericsson," insert -- (publ) --.

In Column 3, Line 49, delete "1-DSCF" and insert -- 1-CSCF --, therefor.

In Column 5, Line 5, delete "MSCNLR" and insert -- MSC/VLR --, therefor.

In Column 14, Line 67, in Claim 9, delete "port" and insert -- ported --, therefor.

Signed and Sealed this

Thirtieth Day of October, 2007

JON W. DUDAS  
*Director of the United States Patent and Trademark Office*